United States Patent
Josephs et al.

(10) Patent No.: US 11,904,848 B2
(45) Date of Patent: Feb. 20, 2024

(54) LOW-ENERGY IMPACT COLLISION DETECTION

(71) Applicant: Zoox, Inc., Foster City, CA (US)

(72) Inventors: Marina Camille Josephs, San Jose, CA (US); Mark Alan Bates, Kenilworth (GB); Nam Gook Cho, Cupertino, CA (US); Subhasis Das, Menlo Park, CA (US); Markus Jost, San Mateo, CA (US); Amanda Brown Prescott, Half Moon Bay, CA (US); Valerie Bumbaca Randolph, Fremont, CA (US); Subasingha Shaminda Subasingha, San Ramon, CA (US)

(73) Assignee: Zoox, Inc., Foster City, CA (US)

( * ) Notice: Subject to any disclaimer, the term of this patent is extended or adjusted under 35 U.S.C. 154(b) by 260 days.

(21) Appl. No.: 17/245,963

(22) Filed: Apr. 30, 2021

(65) Prior Publication Data
US 2022/0348192 A1   Nov. 3, 2022

(51) Int. Cl.
| | |
|---|---|
| *B60W 30/08* | (2012.01) |
| *G08G 1/16* | (2006.01) |
| *G01B 7/16* | (2006.01) |
| *B60W 60/00* | (2020.01) |
| *G01V 1/00* | (2006.01) |

(52) U.S. Cl.
CPC ........ *B60W 30/08* (2013.01); *B60W 60/0015* (2020.02); *G01B 7/18* (2013.01); *G01V 1/001* (2013.01); *G08G 1/166* (2013.01); *B60W 2030/082* (2013.01); *B60W 2420/54* (2013.01)

(58) Field of Classification Search
CPC ............ B60W 30/08; B60W 60/0015; B60W 2030/082; B60W 2420/54; G01B 7/18; G01V 1/001; G08G 1/166
See application file for complete search history.

(56) References Cited

U.S. PATENT DOCUMENTS

| | | |
|---|---|---|
| 7,278,657 B1 | 10/2007 | McCurdy |
| 2008/0210020 A1* | 9/2008 | Bieck ............... G01P 15/135 73/862.68 |
| 2010/0268423 A1 | 10/2010 | Breed |

(Continued)

FOREIGN PATENT DOCUMENTS

| | | |
|---|---|---|
| JP | H08153298 A | 6/1996 |
| JP | 2018192917 A | 12/2018 |
| WO | WO2020208446 A1 | 10/2020 |

OTHER PUBLICATIONS

PCT Search Report dated Aug. 11, 2022 for PCT Application No. PCT/US22/26968, 15 pages.

*Primary Examiner* — Dale W Hilgendorf
*Assistant Examiner* — Hana Lee
(74) *Attorney, Agent, or Firm* — Lee & Hayes, P.C.

(57) ABSTRACT

This disclosure relates to systems and techniques for identifying collisions, such as relatively low energy impact collisions involving an autonomous vehicle. Sensor data from a first sensor modality in a first array may be used to determine a first estimated location of impact and second sensor data from a second sensor modality in a second array may be used to determine a second estimated location of impact. A low energy impact event may be configured when the first estimated location of impact corresponds to the second estimated location of impact.

20 Claims, 5 Drawing Sheets

(56) References Cited

U.S. PATENT DOCUMENTS

| | | | |
|---|---|---|---|
| 2013/0035827 A1* | 2/2013 | Breed | B60W 40/06 |
| | | | 701/45 |
| 2014/0195070 A1* | 7/2014 | Shimizu | B60W 30/095 |
| | | | 701/1 |
| 2019/0111876 A1* | 4/2019 | Siddiqui | B60R 21/0136 |
| 2021/0009062 A1* | 1/2021 | Andres | G01S 7/40 |
| 2021/0049363 A1* | 2/2021 | Freitas Cunha | H04W 4/021 |
| 2021/0380059 A1* | 12/2021 | Jones | B60R 21/01 |
| 2022/0153304 A1* | 5/2022 | Kanzler | B60W 30/095 |

* cited by examiner

LOW-ENERGY IMPACT COLLISION DETECTION

BACKGROUND

In the event of a collision, safety systems on passenger transport vehicles may be designed to mitigate the effects of the crash, e.g., by inflating an airbag or tightening a physical restraint. In many such safety systems, accelerometers and/or other sensors are placed at the front of a vehicle to detect a sudden and large change in acceleration or other movement of the vehicle, such as caused by striking an object head-on, and the sensed condition is used to deploy the safety system, e.g., by inflating an airbag. Conventional safety systems are often not optimized for detecting low-energy collisions, where it is not necessary to deploy conventional safety apparatus to ensure the safety of passengers of the vehicle. However, low-energy collisions occur frequently during vehicle operation.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
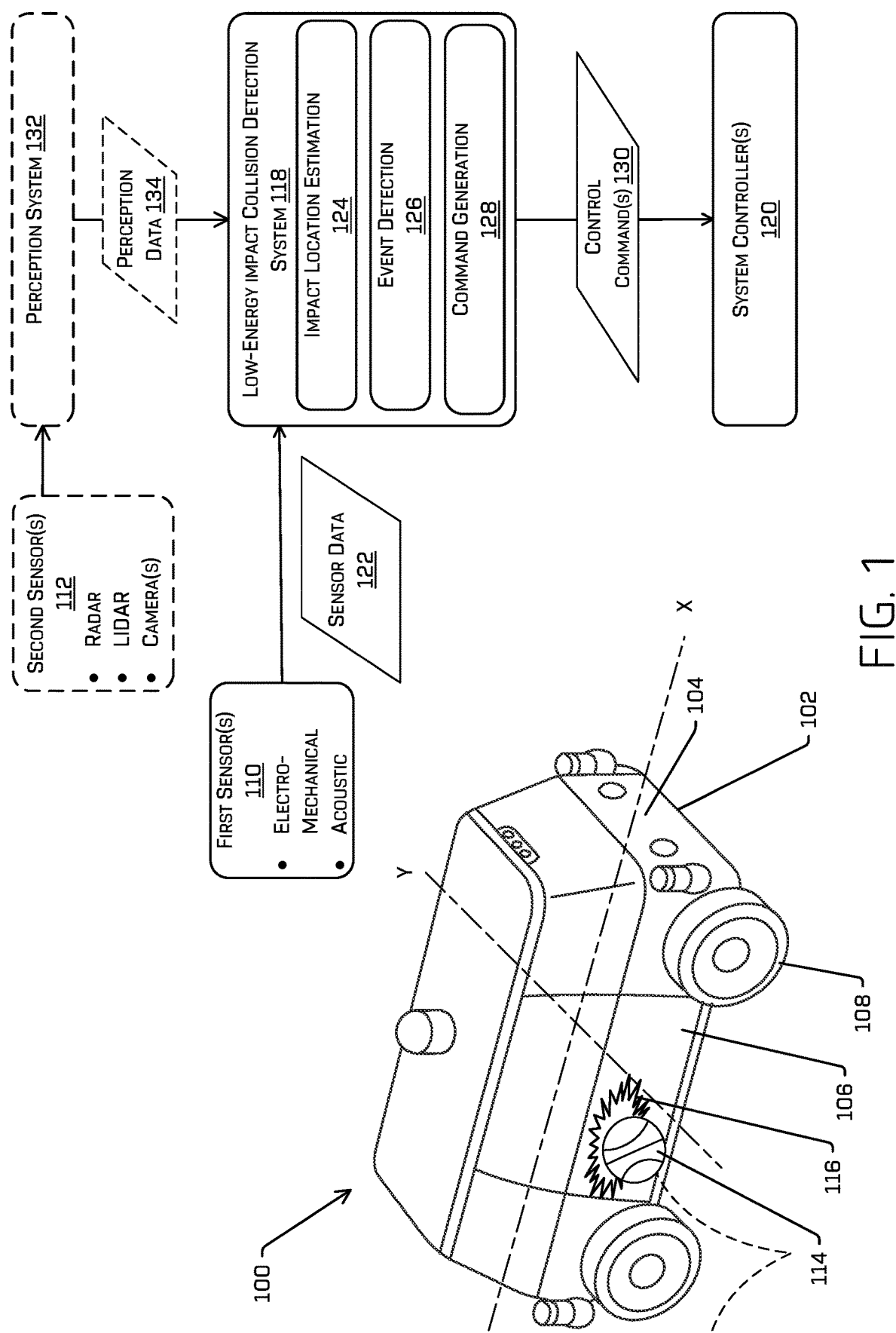
FIG. 1 illustrates an example environment in which the techniques discussed herein may be implemented.

This disclosure is directed to a vehicle including a low-energy collision detection system. The low-energy impact collision detection system is configured to detect low-energy impact collisions, and control the vehicle in the event of a low-energy impact collision. The collision detection system may be communicatively coupled to a sensor system associated with the vehicle, and configured to receive information from the sensor system. The collision detection system is also operatively coupled to a system controller configured to control the vehicle according to the actions generated by the collision detection system. In examples, the low-energy impact collision detection system may be in addition to a conventional or high-energy impact collision detection system used to detect and/or respond to relatively higher impact collisions, e.g., to deploy airbags or the like.

The low-energy impact collision detection system is configured to detect and respond to low-energy impact collisions. For example, a low-energy impact collision may involve a medium-velocity impact with a low-mass object, such as a collision with a bicycle or a scooter, an animal, a pedestrian or a small object. A low-energy impact collision may also involve a low-velocity impact with a high-mass object, such as a collision with another vehicle or a barrier in a parking lot, while the vehicle was stationary or slow-moving.

Low-energy impact collision events typically do not require the deployment of conventional vehicle safety systems, such as airbag and air curtain systems or passive restraints, but may require the vehicle to perform some other actions e.g., stopping or communicating with an operator. Whereas, the primary collision detection system is associated with the conventional vehicle safety systems, and is configured to take some action, e.g., deploying an airbag or tightening a restraint, that are known to help ensure safety of passengers in the vehicle in instances of relatively higher impact collisions.

Example vehicles, such as example autonomous vehicles, may include one or more types of sensor modalities for detecting low-energy impact collisions. These sensors may be attached to, or mounted on a body of the vehicle generally on surfaces exposed to the environment in which the vehicle is operating. In some examples, multiple sensor units may be distributed spatially on different portions of the body configured to provide spatial coverage of the body of the vehicle. The density of sensors may also be higher on areas of the body that have a higher likelihood of collision with external objects e.g. the lower portions located at two ends (e.g., the front and the back) of the vehicle. The sensors may also be attached to or mounted on wheel covers or fenders of the vehicle. According to some examples, the types of sensor modalities may include electromechanical sensors (e.g. impact sensors, inertial sensors) and acoustic sensors (e.g. microphones) to capture mechanical stresses and sound/vibration respectively, which may result from a collision.

In some examples, the vehicle may be equipped with electromechanical sensors, which may be impact sensors in the form of resistive film strips. Such sensors detect a change in electrical conductivity when the strip is bent. The impact sensors may be attached to lower portions of the vehicle, which may be more likely to be associated with a low-energy impact collision. In some instances, the impact sensors may be incorporated in body panels of the vehicle at areas more likely to be struck during a low-energy impact collision. For example, the sensors may be placed at the ends of the vehicle, on lateral sides of the vehicle, and/or at wheel coverings of the vehicle. The impact sensors will detect a change in conductivity when the surfaces to which they are attached are deformed during a low-energy impact collision. In some instances, the electromechanical sensors are disposed in an array.

The vehicle may also be equipped with acoustic sensors. For instance, the acoustic sensors can include multiple microphones disposed at spatially separated locations of the vehicle. In some instances, the acoustic sensors can be positioned at areas of the vehicle more likely to be struck during a low-energy impact collision. The acoustic sensors may be coupled to body panels of the vehicle, which panels may also incorporate the electromechanical sensors. The acoustic sensors may be configured to detect audio associated with a collision. In some examples, by comparing audio received at two audio sensors, the techniques described herein may implement spatial localization techniques to estimate a source of the sound.

In aspects of this disclosure, a low-energy impact collision detection system may estimate one or more locations of impact based on sensor data, such as from the mechanical and/or acoustic sensors. For examples, the techniques described herein may determine, based on the sensor signals and known locations of the sensors an estimate of the location of the impact on the vehicle. For example, in the instance of an impact, the sensor(s) at the point of impact will register the highest signal, with the signal strength falling with increasing distance from the point of impact. In general, the strength of sensor signal will depend on the proximity of the impact location to the sensor location. Sensor signals at non-impact areas (e.g., not involved in the collision) may be much lower than the sensor signals in the neighborhood of the impact. In one non-limiting example, the sensor signals may be clustered into two groups based on signal strength e.g., by using k-means clustering with k=2. The impact location may be estimated as the spatial center of the sensor cluster with the higher mean.

Sensor signal levels from non-impact areas may also be learned from training data collected during typical vehicle operations. The learned signal levels corresponding to non-impact areas may be used as reference signals. For example, a measured sensor signal may be compared with the reference signal, and if the difference is higher than a threshold, the sensor may be identified as being in an impact area. The estimated location of impact may then be computed as the spatial center of the sensors identified in the impact area, or the estimated location of impact could correspond to the location of the sensor with the highest signal. Other data may also be considered in the trained model. For example, and without limitation, windspeed proximate the vehicle, e.g., resulting from movement of the vehicle and/or current atmospheric conditions, may impact signals generated at the sensors.

The impact location estimation component may also implement various Artificial Intelligence (AI) techniques, such as machine learning, for predicting the location and type of a collision from a set of sensor signals. Training data sets corresponding to low-energy impact collisions may be gathered from operating data of vehicles equipped with the relevant sensors. The training data set may be labeled with the location and type of impact, and include data where there is no impact. When a trained model is deployed, the impact location estimation component may input the sensor signals into the trained model, and receive an estimate of the location of impact. In examples, multiple neural networks each trained with a different type of sensor may be deployed. A single neural network with different types of sensor signals agglomerated as inputs may also be used instead. The techniques used for estimating impact location may be similar or different for each type of sensor modality.

The techniques described herein may also confirm a low-energy impact collision event by checking for consistency between collision indications from different types of sensor systems. For example, a first type of sensors (e.g., electromechanical sensors) may indicate an impact in one area of the vehicle. It is expected that a second type of sensors (e.g., acoustic sensors) disposed in the same area of the vehicle should also indicate an impact, in the instance of an actual collision. If there is no corresponding signal from the second type of sensors indicating an impact in the same area, the techniques described herein may determine that a low-energy impact collision event has not occurred. In another example, if both the first type of sensors and the second type of sensors indicate a possible impact in the same area of the vehicle, a low-energy impact collision event has occurred.

In some examples, a perception component can provide additional input to the low-energy impact collision detection system. The perception component may include functionality to perform object detection, segmentation, and/or classification. In some examples, the perception component may output perception data that indicates a presence of an object or objects proximate to the autonomous vehicle and/or a classification of the object as an object type (e.g., a car, pedestrian, cyclist, building, tree, road surface, curb, sidewalk, unknown, etc.). Additionally, the perception component may provide processed sensor data that indicate a position and trajectory associated with detected object(s) and/or a likelihood of impact with the object based on the vehicle position and trajectory. In a non-limiting example, the perception data may identify detected object(s) that could have collided with the vehicle at the estimated location of impact determined from the first sensor(s) and/or the second sensor(s). The presence of such object(s) may confirm a low-energy impact collision event, and the absence of such objects may indicate that no low-energy impact collision event has occurred.

In some examples, the perception component may detect object(s) proximate to the vehicle and determine that the object is likely to strike the vehicle. In some examples, the techniques described herein can determine an expected location of impact based on the perception data. Information about the likely strike (and the location of that likely strike) may cause the systems described herein to request signals from other sensors on the vehicle, e.g., to determine whether that data suggests or confirms an impact. If either the first type of sensors or the second type of sensors indicates an impact in the expected impact location, a low-energy impact collision event is confirmed by the event detection component. If the first and the second types of sensors both do not indicate an impact at the expected location, the event detection component may indicate that a low-energy impact collision has not occurred.

Implementations of this disclosure also include acting in response to determining impact events. For instance, techniques described herein can generate command(s) for system controllers(s) of the vehicle to control the vehicle based on the detected event. For example, in the instance of a low-energy impact collision event, the command generation component may generate commands for the system controller(s) to perform one or more actions e.g., to bring the vehicle to a stop if currently moving, gather and transmit or store operational data related to the event, and/or initiate a communication with a tele-operator or other humans in or near the vehicle. The techniques described herein also improve safety outcomes. For instance, by identifying low-energy impacts, the techniques described herein can identify, and support fixing, potential damage to the vehicle, as well as identify and react to potential damage to objects that may impact the vehicle.

The techniques, assemblies, and systems described herein may be implemented in a number of ways. Example implementations are provided below with reference to the following figures. Although discussed in the context of an autonomous vehicle, in some examples, the methods, apparatuses, and systems described herein may be applied to a variety of systems. In another example, the methods, apparatuses, and systems may be utilized in an aviation or nautical context. Additionally, or alternatively, the techniques described herein may be used with real data (e.g., captured using sensor(s)), simulated data (e.g., generated by a simulator), or any combination thereof.

FIG. 1 illustrates an example of an autonomous vehicle 100, in which the techniques discussed herein may be implemented. The autonomous vehicle may be configured to operate according to a Level 5 classification. The Level 5 classification was issued in 2016 by the U.S. National Highway Traffic Safety Administration and describes a vehicle capable of performing all safety-critical functions for the entire trip, with the driver (or occupant(s)) not being expected to control the vehicle at any time. In that case, since the vehicle may be configured to control all functions from start to stop, including all parking functions, it may be unoccupied. This is merely an example, and the systems and methods described herein may be incorporated into any ground-borne vehicle, also including conventional automobiles in which all vehicular control is performed by a driver and vehicles that are partially autonomously controlled, such that they can be autonomously controlled without driver attention or assist during certain driving conditions, such as, for example, while operating on limited-access highways. Such partially autonomously controlled vehicle may require driver attention and/or assistance during other driving conditions, such as, for example, while operating on city streets in urban areas, or during at least some parking functions.

As illustrated in FIG. 1, the vehicle 100 has a body 102 generally defining an exterior of the vehicle e.g., surfaces exposed to the environment in which the vehicle 100 is operating. The body 102 may be disposed on or more generally include a frame or one or more additional support structures (not shown), as is conventionally known. In the example vehicle 100, the body generally includes a first exterior surface 104 at a first end, and a second exterior surface (not visible in FIG. 1) at a second end opposite the first end. The first exterior surface 104 and the second exterior surface are separated along a longitudinal axis X by a vehicle length. The body 102 also includes side or lateral exterior surface 106 (one of which is shown), extending between the first end and the second end of the vehicle 100, and separated along a lateral axis Y, by a vehicle width. The body 102 may further include one or more doors, e.g., comprising all or part of on one or both of the lateral sides 106, for facilitating ingress and egress to and from an interior space of the vehicle 100. The vehicle 100 may also include a windshield and/or other windows, e.g., comprising some or all of the exterior surface 104, 106. As the vehicle 100 may be embodied as an autonomous vehicle, windshields and/or windows may not be required.

As further illustrated in FIG. 1, the vehicle 100 is transported by wheels 108 (the vehicle has four wheels, two of which are shown in FIG. 1). Although the example vehicle 100 has four wheels, the systems and methods described herein may be incorporated into vehicles having fewer or a greater number of wheels, and/or tracks. Portions of the wheels 108 may be equipped with a protective covering e.g., bumpers or fenders (shown in FIG. 2). Such protective covering may be a portion of the body 102 and/or the exterior surfaces 104, 106. The example vehicle 100 may have four-wheel steering and may operate generally with equal performance characteristics in all directions e.g., in a first direction where the first end is the leading end of the vehicle 100, and a second direction, opposite the first direction, where the second end is the leading end of the vehicle 100. The vehicle 100 may be powered by one or more internal combustion engines, one or more batteries and electric motors, hydrogen fuel cells, or any combination thereof (none of which are shown).

The example vehicle 100 includes one or more first sensors 110, mounted on or otherwise coupled to the body 102 of the vehicle 100. Data generated by the first sensor(s) 110 is used to sense low-energy impact collisions with the vehicle 100, as detailed further herein. The first sensor(s) 110 associated with the vehicle 100 may include one or more types or modalities. For instance, the first sensor(s) 110 may include electromechanical sensors, such as impact sensors (e.g., fiber-optic sensors, pressure tubes, piezoelectric or resistive thin film sensors), inertial sensors (e.g., inertial measurement units (IMUs), accelerometers), and/or proximity sensors (e.g., capacitive, microwave, optical/infra-red, or ultrasonic proximity sensors). The first sensor(s) 110 may also include acoustic sensors, such as resistive, capacitive, fiber-optic, piezoelectric or electret microphones, directional microphones, and/or surface acoustic wave (SAW) devices. The acoustic sensors may be set up as a wireless acoustic sensor network (WASN), or as a traditional (wired) array.

The vehicle 100 may also be equipped with one or more second sensors 112 mounted on or otherwise coupled to the body 102 of the vehicle 100. In examples of this disclosure, data generated by the second sensor(s) 112 enables autonomous or semi-autonomous vehicle operations, e.g., for vehicle navigation, obstacle avoidance, collision handling, or the like. The second sensor(s) 112 may include a number of modalities, including but not limited to light detection and ranging (LIDAR) sensors, RADAR sensors, ultrasonic transducers, sonar sensors, location sensors (e.g., global navigation satellite system (GNSS) (including global positioning systems (GPS)), compass, etc.), inertial sensors (e.g., inertial measurement units (IMUs), accelerometers, magnetometers, gyroscopes, etc.), cameras (e.g., red-green-blue (RGB), infrared (IR), intensity, depth, etc.), time of flight sensors, microphones, wheel encoders, and/or environment sensors (e.g., temperature sensors, humidity sensors, light sensors, pressure sensors, etc.). Although example modalities of the first sensor(s) 110 provided above are different from the example modalities of the second sensor(s) 112, in some instances, the first sensor(s) 110 and the second sensor(s) 112 may include the same modalities and/or the same sensors. This description may distinguish between the first sensor(s) 110 as sensors generating data used for a first purpose or first purposes, e.g., for determining low-energy impact collisions, and the second sensor(s) 112 as sensors generating data used for a second (different) purpose or purposes, e.g., for normal driving operations. However, the first sensor(s) 110 and the second sensor(s) 112 may be the same sensors and/or sensor modalities in some examples. Without limitation, data from a single sensor may be used for the first purpose(s) as well as for the second purpose(s), so that sensor may be associated with both the first sensor(s) 110 and the second sensor(s) 112.

The vehicle 100 may be equipped with a safety system (not shown) that may include an air bag, an air curtain system, seat belt tensioners, or the like. For example, in conventional safety systems, the second sensor(s) 112 may include an accelerometer placed proximate to the front of the vehicle 100, generally along the longitudinal axis X. When the front of a vehicle 100 collides with an object, e.g., in a head-on collision, the accelerometers sense a drastic change in acceleration, and an airbag is deployed. In general, the conventional safety system includes any vehicular impact-mitigation system, which may be an internal safety system designed to directly interact with passengers and/or cargo carried by the vehicle, and/or an external safety system, which may be designed to deploy or otherwise activate outside the vehicle to protect the vehicle and/or the passengers/cargo in the vehicle. Internal safety system may include, for example, one or more airbags, air curtains, restraint systems, or the like. External safety systems may include external bladders, active bumper devices, or the like.

The conventional safety systems just described are generally used to mitigate damage to the vehicle 100, to passengers in the vehicle 100, and/or to cargo in the vehicle 100 in relatively higher impact collisions. For instance, lower impact or relatively minor collisions, such as fender-benders, parking lot mishaps, curb bumps, objects impacting the body 102 of the vehicle 100, no- or low-speed collisions, and the like, may not be detected using these conventional safety systems. In fact, it may be undesirable in some instances to employ conventional safety systems in response to these relatively minor collisions. For example, it may be undesirable to deploy airbags in response to a windblown shopping cart bumping into a door of the vehicle 100.

Although conventional safety systems are generally used to detect and/or respond to higher impact collisions, it may still be desirable to identify lower-impact collisions. For example, these lower impact collisions may still result in damage to the vehicle 100, to an object striking the vehicle 100, or the like. Aspects of this disclosure are directed to identifying these lower-impact collisions.

In some examples, a collision may be characterized based on an impact energy level of the collision. For example, a collision with an impact energy of collision equal to or more than a threshold level (e.g., five thousand Joules) may be a "high-impact" or "relatively higher impact" collision, whereas, a collision with an impact energy below the threshold level may be a "low-impact" or "relatively lower impact" type of collision. A low-energy impact collision may result from a low- or medium-velocity impact with a medium-mass object, such as a collision with a bicycle or a scooter, a low- or medium-velocity impact with a low-mass object, such as an animal, pedestrian or a small object, or a low- or no-velocity impact with a high-mass object, e.g. contacting a barrier or another slow-moving or stationary vehicle in a parking lot. As already discussed, relatively higher-impact collisions may be detected and responded to by the conventional safety systems of the vehicle 100. However, conventional safety systems may not detect low-energy impact collisions, as conventional impact-mitigation systems such as airbags and seat belts are not needed to be engaged for ensuring passenger safety in the instance of such low-energy impact collisions. However, low-energy impact collisions may require the vehicle to perform some other actions in response.

Aspects of this disclosure are directed to an improved collision detection and response system in the instance of such low-energy impact collisions. More specifically, FIG. 1 illustrates a scenario in which, as the vehicle 100 traverses the environment, an object 114 (in the example, a ball) collides with the vehicle 100. The object impacts the body 102 of the vehicle 100 at an impact location 116. As will be appreciated, the object 114 colliding with the vehicle 100 is shown for example only; other examples of objects and/or of low-energy impact collisions are provided herein and will otherwise be appreciated with the benefit of this disclosure.

As shown in FIG. 1, examples of this disclosure include a low-energy impact collision detection system 118. The low-energy impact collision detection system 118 is communicatively coupled to the first sensor(s) 110 and to one or more system controllers 120 of the vehicle 100. As described in more detail below, the low-energy impact collision detection system 118 may receive sensor data 122 from the first sensor(s) 110 and determine control command(s) 130 based at least in part on the sensor data 122. The control command(s) 130 indicate actions to be taken, e.g., bringing the vehicle to a stop, communicating with a tele-operator, storing operational data, or the like. The system controller(s) 120 of the vehicle 100 perform the actions based on the control commands 130 received.

The system controller(s) 120 may communicate with and/or control corresponding systems of one or more drive systems and/or other components of the autonomous vehicle 100. For instance, the system controller(s) 120 may control steering, propulsion, braking, safety, emitters, communication, and/or other systems of the vehicle 100.

The low-energy impact collision detection system 118 may generally implement various techniques to detect and/or respond to low-energy impact collisions involving the vehicle 100 and external objects 114 in the environment. As illustrated in FIG. 1, the low-energy impact collision detection system 118 can include an impact location estimation component 124, an event detection component 126, and a command generation component 128. For example, the impact location estimation component 124 of the low-energy impact collision detection system 118 may process the sensor data 122 from the first sensor(s) 110 to generate an estimate of a location of impact, e.g., the impact location 116, on the body 102 of the vehicle 100. When the first sensor(s) 110 include different types of sensor modalities, e.g., mechanical and acoustic, the impact location estimation component 126 may process disparate types of sensor data 122 from the different modalities of first sensor(s) 110 separately. For example, when the first sensor(s) 110 include one or more electromechanical sensors and one or more acoustic sensors the impact location estimation component 126 may generate a first estimated location of impact based on data generated by the one or more electromechanical sensors in response to the contact of the object 114 with the vehicle 100 and of a second estimated location of impact based on data generated by the one or more acoustic sensors in response to the contact of the object 114. In some examples, the impact location estimation component 126 may also determine a probability, certainty, or similar metric associated with the estimated location(s). Examples of determining estimated locations are detailed further below, including in connection with FIG. 2.

The sensor data 122 used by the impact location estimation component 126 may be from a plurality of sensor modalities. Many types of sensor systems inherently exhibit both false positives, where the sensor signals indicate a condition that did not occur, and false negatives, where the sensor signals do not indicate a condition that has occurred. Additionally, conditions within the environment in which the vehicle 100 operates may cause the first sensor(s) 110 to generate sensor data that could lead the low-energy impact collision detection system 118, e.g., via the event detection component 126, to falsely identify an event. For example, acoustic sensors may indicate a large signal due to noise associated with doors being closed, an engine backfiring, a horn honking, the vehicle 100 going over a pothole, or the like. Similarly, in environments having high ambient noise, it may be difficult to isolate sound associated with an impact and/or generate an accurate estimated location. By deploying different types of sensors, and analyzing data from those sensors, false positives and false negatives may be reduced in the system as disclosed herein.

The estimated locations of impact from each type of sensor modality, e.g., as determined by the impact location estimation component 126 may or may not correspond to the same location on the body 102 of the vehicle 100. In some instances, the sensor data 122 from one or more of the sensor(s) 110 of a first modality may indicate no location of impact, e.g., no collision, whereas the sensor data 122 from one or more other of the sensor(s) 110 may indicate an impact. In other examples, because of sensor locations, sensor fidelity, sensor accuracy, and/or other factors, estimated impact locations associated with an impact may vary based on the different modalities.

The event detection component 126 of the low-energy impact collision detection system 118 identifies events based on the estimated location(s) of impact determined by the impact location estimation component 124. For instance, the event detection component 126 may receive information about the estimated impact location(s), and in some instances, information about a certainty of those estimates, and determine whether an event, e.g., a low impact collision event, has transpired. In one example, the event detection component 126 can determine an event with a plurality of estimated impact locations are within a predetermined threshold distance. In another example, the event detection component 126 can determine an event when a certainty of an impact location is equal to or above a threshold certainty. The event detection component 126 may implement a number of different logic flows to identify the event, some examples of which will be discussed below with reference to FIG. 4 and FIG. 5.

The event detection component 126 may also perform additional functions. For example, the event detection component 126 may include functionality to determine whether other collision detection systems of the vehicle 100 indicate that a collision, e.g., a relatively higher impact collision, has occurred. For instance, the low-energy impact collision detection system 118, while useful to detect relatively lower impact collisions, may also detect relatively higher-impact collisions. However, these higher-impact collisions are likely to be handled using conventional collision detection and/or collision mitigation systems. Thus, the event detection component 126 may not determine an event (or take further action associated with the event) if the event is already determined via a different system. In the instance of a low-energy impact collision event, the event detection component 126 may also include additional information characterizing the low-energy impact collision, such as a vehicle speed at the time of the collision, a force associated with the impact, or the like.

The command generation component 128 includes functionality to generate one or more control commands 130 for responding to the event e.g., a low-energy impact collision event. As detailed herein, the control command(s) 130 can configure the system controller(s) 120 and/or other aspects of the vehicle 100 to perform one or more operations, e.g., bring the vehicle to a stop if currently moving, gather and transmit or store operational data related to the event (including, but not limited to, sensor data, control data, and any intermediate message data generated), and/or initiate a communication with a tele-operator or other humans in or near the vehicle. In still further examples, the control command(s) 130 can configure the vehicle computing systems to generate and/or store data at other sensors, e.g., the second sensor(s) 120 that may provide additional information about the impact. Without limitation, the control command(s) 130 may configure a camera or other imaging device having a field of view in which the detected impact was determined to generate and/or store data that may provide further information about the impact event. For instance, the control command(s) 130 may cause the vehicle 102 to store data generated by one or more of the second sensor(s) 112 for a predetermined amount of time, e.g., 30 seconds, 90 seconds, or the like, before and/or after the impact.

In the instance a low-energy impact collision event is detected, the command generation component 128 may issue a control command 130 to bring the vehicle to a stop. The system controller(s) 120 may respond to this control command by decelerating the vehicle 100 to a stop e.g., a gentle stop associated with a deceleration rate that is less than a maximum deceleration rate that is possible for the vehicle 100. For example, a gentle stop may include braking at a particular rate, such as a predetermined rate, a rate that is less than a first rate (e.g., maximum braking rate), a rate that is greater than a second rate (e.g., minimum braking rate), a rate from among a plurality of available rates that is substantially in the middle (e.g., a third rate from among five rates), a minimum rate from among a plurality of rates, and so on. A rate of deceleration may refer to a unit of measurement over time, such as a number of meters or feet per second squared (m/s^2). In one example, a gentle stop may include decelerating at a rate of 5 or 10 feet per second squared until the autonomous vehicle 102 comes to a stop.

The command generation component 128 may also respond to a low-energy impact collision event by issuing a control command 130 to initiate communications with a tele-operator. The system controller(s) 120 may respond to this control command by enabling a communication channel between a communication unit of the vehicle and a tele-operator, e.g., over a network. The communication channel may be used by the tele-operator to communicate with person(s) located in and around the vehicle 100. This may include passengers traveling in the vehicle 100 at the time of the low-energy impact collision, police personnel responding to the scene of the collision, and other persons present in the vicinity of the vehicle at the time of the collision.

Further, the command generation component 128 may issue a control command 130 to store or transmit vehicle operational data after a low-energy impact collision event. In response, the system controller(s) 120 may gather and store vehicle operational data for an interval of time preceding and subsequent to the event. The vehicle operational data may include vehicle speed, heading, steering angle, as well as sensor data 122 from the sensors 110 disposed on the vehicle 100. The operational data may be stored locally in an on-board memory of the vehicle 100, or transmitted to an external computing system via a network.

In the instance that the event detection component 126 generates a no-impact event, the command generation component 128 may generate no control command(s) 130 and no action may be performed by the system controller(s) 120. However, in some examples, the command generation component 128 may generate control command(s) to store sensor data 122 and/or other operational data, for example if there is a false positive in a part of the sensor data 122. In response, the system controller(s) 120 may gather and store the data as described above.

The vehicle 100 may also include a perception system 132, which can provide additional (optional) input to the low-energy impact collision detection system 118, in some examples. The perception system 132 generates perception data 134 associated with the environment of the vehicle 100. For example, the perception data 134 can include information about objects, such as the object 114, detected in the environment proximate the vehicle 100 using sensor data from the second sensor(s) 112. The perception data 134 can include one or more attributes associated with detected objects(s). These attributes may include, but are not limited to, a classification of the object, as an object type (e.g., a car, pedestrian, cyclist, etc.), a position of the object, (e.g., an x-, y-, and/or z-position in a local or global coordinate system, a relative position, or the like), an orientation of the object, a velocity of the object, an extent of the object (e.g., size, which may be a bounding box representing the object), a trajectory associated with the object, a likelihood of impact with the object based on the vehicle position and trajectory, and/or an expected location of impact of the object with the vehicle 100. In some examples, a trajectory of an object may be determined from RADAR processing and/or other techniques.

The perception data 134 can be used by the low-energy impact collision detection system 118 to improve the reliability of determining the event. For instance, the impact location estimation component 124 may generate estimated location(s) of impact based on the perception data 134 in addition to estimated location(s) determined based on the sensor data 122. In other examples, the perception data 134 may indicate that an object is within a threshold distance, e.g., one meter, 0.1 meter, or the like, of the vehicle. The event detection component 126 may use this proximity data to confirm the likelihood of an event, for instance, as described below with reference to FIG. 4 and FIG. 5.

Additional details of the low-energy impact collision detection system useful in vehicles, including the low-impact sensor system disposed on the vehicle 100 will now be described with reference to the remaining figures.

Figure 2:
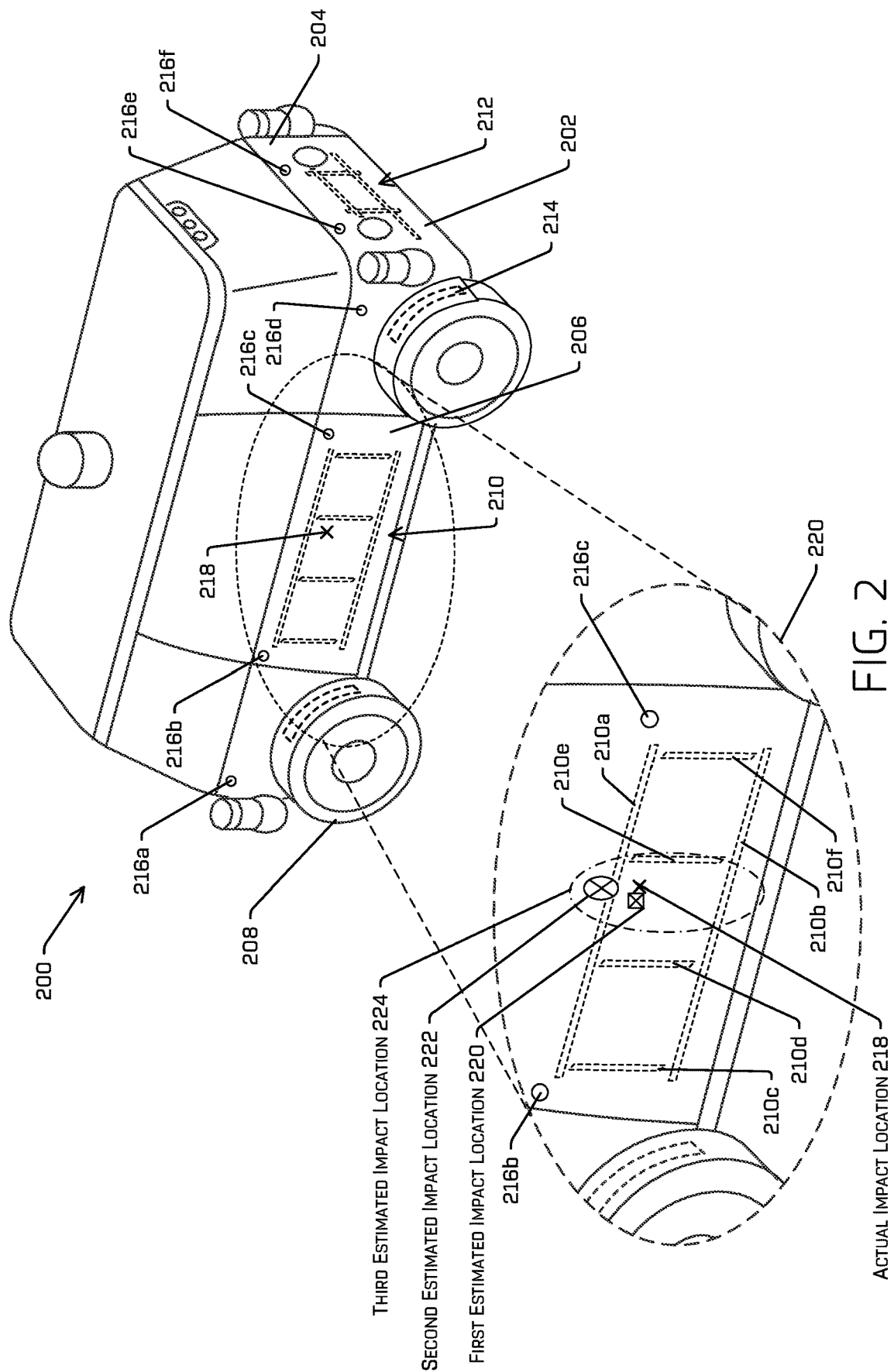
FIG. 2 depicts details of a vehicle equipped with a low-energy impact collision detection system, according to an example embodiment of the present disclosure.

FIG. 2 depicts an example vehicle 200 having a plurality of sensors. In examples, the vehicle 200 may be similar to or the same as the vehicle 100 discussed above. The sensors may be similar to or the same as the first sensor(s) 110 and/or the second sensor(s) 112 of FIG. 1. The sensors are configured to generate data associated with low-energy impact collisions involving the vehicle 200.

As illustrated in FIG. 2, the vehicle 200 includes a body 202, which may be the body 102 described above with reference to the vehicle 100. The body 202 generally defines an exterior of the vehicle e.g., surfaces exposed to the environment in which the vehicle 200 is operating. The body 202 generally includes a first exterior surface 204 at a first end, and a second exterior surface (not visible in FIG. 2) at a second end opposite the first end. The body 202 also includes side or lateral exterior surface 206 (one of which is shown), extending between the first end and the second end of the vehicle 200. The vehicle 200 is transported by wheels 208 (two of which are shown in FIG. 2). Portions of the wheels 208 may have protective wheel coverings as illustrated in FIG. 2. Such protective covering may be a portion of the body 202 and/or the exterior surfaces 204, 206. More or fewer body sections may also be included. For example, the body 202 may also include one or more of a windshield, door panels, bumpers, or the like.

The example vehicle 200 includes one or more sensors mounted on or otherwise coupled to the body 202 of the vehicle 200. The sensors may correspond to the first sensor(s) 110 and/or the second sensor(s) 112. Sensor data generated by the sensor(s) may correspond to sensor data 122, and is used to sense low-energy impact collisions with the vehicle 200, as detailed further herein. In the example of FIG. 2, the sensors include first electromechanical sensors 210, second electromechanical sensors 212, and third electromechanical sensors 214. The sensors also include a plurality of acoustic sensors, including a first acoustic sensor 216a, a second acoustic sensor 216b, a third acoustic sensor 216c, a fourth acoustic sensor 216d, a fifth acoustic sensor 216e, and a sixth acoustic sensor 216f. Herein, two or more of the first acoustic sensor 216a through the sixth acoustic sensor and/or other acoustic sensor(s) not illustrated in FIG. 2 may be referred to herein as "the acoustic sensors 216." The electromechanical sensors 210, 212, 214 and/or the acoustic sensors 216 may be arranged in a predetermined pattern, in order to provide a desired area of coverage on the body 202 of the vehicle 200. The sensors may be disposed in a pattern that enables approximately 360-degree sensing around the vehicle 200. This may enable the vehicle 200 to detect collisions in the first end 204 or the second end, lateral sides 206, or wheels 208 of the vehicle 200. A higher density of sensors may be disposed on areas of the vehicle that have a higher likelihood of being involved in collisions e.g., the lower portion of the body 202, than on other areas of the vehicle. In some instances, portions of the vehicle may be free of any sensors. Without limitation, and for example only, the roof may be of electromechanical sensors and/or acoustic sensors.

In examples, the electromechanical sensors 210, 212, 214 may be thin film resistance sensors that change electrical conductivity in response to bending or flexion. The electromechanical sensors 210, 212, 214 may be attached to the body 202 of the vehicle 100 to sense distortions on the body 202 caused by an impact, such as the impact 116 caused by the object 114. Without limitation, the electromechanical sensors 210, 212, 214 may be secured to body panels making up the body 202. For instances, the electromechanical sensors 210, 212, 214 may be adhered to an interior surface (opposite the visible, exposed, outer surface) of portions of the body 202. Other types of electromechanical sensors may be used instead or in addition to the illustrated resistance sensors. For example, additional or other electromechanical sensors may include other impact sensors (e.g. fiber-optic sensors, pressure tubes, piezoelectric thin film sensors), capacitive paint, electrodes, inertial sensors (e.g., inertial measurement units (IMUs), accelerometers), and/or proximity sensors (e.g. capacitive, microwave, optical/infra-red, or ultrasonic proximity sensors). The electromechanical sensors 210, 212 and 214 may be of the same type, or of different types.

In the embodiment shown, the first electromechanical sensors 210 are disposed on the lateral side 206 of the vehicle 200, the second electromechanical sensors 212 are disposed on an end 204 of the vehicle 200, and the third electromechanical sensors 214 are disposed on covering of wheels 208 of the vehicle 200. The electromechanical sensors 210, 212, 214, as shown in FIG. 2, may comprise a plurality of discrete sensors in a predetermined array or arrangement. For instance, a magnified portion 220 of FIG. 2 shows the first electromechanical sensors 210 in more detail. As illustrated, the first electromechanical sensors 210 include a plurality of sensor strips including a first sensor strip 210a and a second sensor strip 210b arranged generally horizontally and spaced in a vertical direction. The first electromechanical sensors 210 also include a third sensor strip 210c, a fourth sensor strip 210d, a fifth sensor strip 210e, and a sixth sensor strip 210f arranged generally vertically and spaced in a horizontal direction. The strips 210a-210f may be arranged to provide coverage of the lateral side 206 of the vehicle 200. The illustrated arrangement is for example only, and other patterns are contemplated. In the example of FIG. 2, the electromechanical sensors 212 are also illustrated as horizontal and vertical strips, arranged to cover of the first end 204 of the vehicle. The sensors are disposed on areas of the vehicle that have a higher likelihood of being involved in collisions e.g., the lower portions of the body 202. Though individual segments arranged in strips are shown, the lateral side 206 and/or the end 202 may also be covered by a sensor array.

The arrangements of the first electromechanical sensors 210 and the second electromechanical sensors 212 are for example only. For instance, other patterns of the strips 210a-210f, which may include more or fewer strips, also are contemplated. Moreover, although the strips 210a-210f are arranged generally horizontally and vertically, other examples may include angles, overlaps, and/or other configurations. The strips 210-210f may each include a plurality of discrete sensors, e.g., spaced along a length of the strip and/or a width of the strip, or may be a single sensor. As detailed further herein, by including a number of discrete sensors, a more accurate estimation of a location of impact with the vehicle 200 may be determined.

As shown in FIG. 2, the vehicle 200 also includes the acoustic sensors 216. The acoustic sensors 216 may be microphones, such as resistive, capacitive, fiber-optic, piezoelectric or electret microphones, and/or surface acoustic wave (SAW) devices, for example. The microphones may be directional and/or have a sensitivity, frequency bandwidth, and/or dynamic range suitable for capturing sound created by a typical impact with the vehicle 200 by any objects. The acoustic sensors 216 may each be an individual sensor of a same or different type, or the acoustic sensors 216 may be set up as a wireless acoustic sensor network (WASN), or as a traditional (wired) array.

As shown, the acoustic sensors 216 are distributed around the vehicle 200. For instance, the first through fourth acoustic sensors 216a-216d are coupled to the lateral side 206, separated from each other. The fifth acoustic sensors 216e and the sixth acoustic sensor 216f are shown disposed on the first end 202 of the vehicle 200. In the illustrated example, the acoustic sensors 216 are illustrated as spaced generally only in a horizontal direction, although in other instances the spacing may be in other and/or additional directions. The acoustic sensors 216 may also include more or fewer sensors. In examples, the acoustic sensors 216 include a plurality of spaced sensors disposed on the body 202, e.g., each side, of the vehicle 200. In examples, the acoustic sensors 216 generate signals in response to environmental noise, and signals from multiple of the acoustic sensors 216 can be used to localize a source of the sound, as described herein. In some examples, the acoustic sensors 216 may be numbered and/or positioned to detect audio originated at any exterior surfaces of the vehicle 200. Moreover, the acoustic sensors may be positioned to overlap at least partly with the area of the body 202 monitored by the electromechanical sensors 210, 212, 214.

The portion of the vehicle 200 not illustrated in FIG. 2 may have sensors identical in distribution to the illustrated side 206 and the end 204, that is, the vehicle and sensor locations may be substantially symmetrical about the lateral and the longitudinal axes, as in the bi-directional vehicle 100. In other implementations, the first or leading end 204 of the vehicle 200 may be different from the second or rear end, as in a conventional vehicle, and/or may include a different distribution of sensors. Although FIG. 2 shows an arrangement of sensors on the vehicle 200, other types and arrangements of the sensors are also contemplated.

Though the example sensors shown in FIG. 2 include electromechanical sensors and acoustic sensors, other types of sensors that are capable of detecting an impact, or side-effects that result from an impact can also be incorporated in the same framework. As examples, ultrasonic sensors and optic/infrared sensors for detecting proximity of objects, and fusion sensors that include both accelerometers and microphones, could also be used instead of or in addition to the mechanical and acoustic sensors described above.

Each of the electromechanical sensors and/or the acoustic sensors may have a unique identifier. The low-energy impact collision detection system 118 may associate a specific location with each sensor indicating the location of the sensor with respect to the vehicle or a section of the vehicle it is disposed on. The location associated with each sensor may be expressed in various ways in two or three dimensions, such as three-dimensional coordinates of a center of the sensor with respect to an origin e.g., at the center of the vehicle 200, two-dimensional coordinates of the center of the sensor with respect to an origin on a plane representing a section of the vehicle 200 (e.g. lateral side 206), or a set of coordinates indicating an extent of the sensor in either two or three dimensions, as non-limiting examples. The low-energy impact collision detection system 118 may also use an internal representation capturing the spatial relationship of the sensors in two or three dimensions e.g., a grid representation with grid cells indicating the presence/absence of sensor or sensor segment at the grid location, and/or a signal value from the sensor located in the grid cell.

For example, each electromechanical sensor segment 210a-f is uniquely identified and associated with a specific location on the body 202 of the vehicle 200 e.g., 210a on the lateral side 206 and associated with the location on the top row nearest the first end 204. The sensor data 122 received by the low-energy impact collision detection system 118 includes a sensor identification and its corresponding signal value, for each of the electromechanical sensors 210, 212, 214 and acoustic sensors 216 disposed on the vehicle 200.

As an example, FIG. 2 shows an impact location 218, which may be the location 116. Though the location of impact 218 is shown on the lateral side 206, it is understood that the location of impact 218 could be on any side of the vehicle or on the wheels 208 of the vehicle 200. There may be no sensor(s) located at the exact location of impact 218 as shown, or the location of impact 218 may correspond to one or more sensor locations. As a result of the impact at the location 218, sensor data 122 from various of the electromechanical sensors 210, 212, 214 and/or various of the acoustic sensors 216 may indicate elevated signal values. For example, the electromechanical sensors 210 may generate a higher signal value than the sensor(s) 212, which are located farther from the impact area. Moreover, individual of the strips comprising the electromechanical sensors 210 may generate different signals based on their proximity to the location. Similarly, the second acoustic sensor 216b and the third acoustic sensor 216c, which are the acoustic sensors 216 closest to the impact location 218, are expected to generate a higher signal value than, for example, the fifth acoustic sensor 216e and the sixth acoustic sensor 216f which are located farther from the impact location 218. The impact location estimation component 124 of the low-energy impact collision detection system 118 estimates the location of impact 218 based on the sensor signal values from the sensors 210, 212, 214, 216 included in the sensor data 122. For example, and as detailed further below, the impact location estimation component 124 can determine a first estimated impact location 220 based on sensor data from the electromechanical sensors 210, 212, 214 and/or may estimate a second estimated location 222 based on sensor data from the acoustic sensors 210.

In the example shown in FIG. 2, the electromechanical sensors 210, 212, 214 cover a substantial portion of the exterior surfaces 204, 206, 214 of the vehicle 200. In the illustrated example, there are no sensors shown exactly at the location of impact 218. But, in other examples, the impact could be located directly on a sensor location. In general, a value of a sensor signal generated by the electromechanical sensors 210, 212, 214 will vary depending on a proximity of the location of impact to the sensor location. For example, in the instance of an impact, the sensor(s) (if any) at the location of impact 218 will register the highest signal value, with the signal values falling with increasing distance from the location of impact 218. In the example illustrated in the magnified portion of FIG. 2, the first and fifth strips 210a, 210e, and lowest at the third strip 210c. Sensor signal values at non-impact areas (e.g., not involved in the collision) on other sides of the vehicle 200 e.g. at sensors 212, may be much lower or even zero. The signal values may indicate an energy of impact, a degree of distortion of a flexible sensor, or any other indication of the severity of the impact. The sensor characteristics of the sensors deployed may provide a mapping between the signal level and the severity of the impact. In some examples, the signal levels may be used to classify an impact as a relatively higher impact collision, or a low-energy impact collision.

The impact location estimation component 124 of the low-energy impact collision detection system 118 may implement various methods for estimating the location of impact, e.g., the first estimated impact location 220 of FIG. 2, from the electromechanical sensors 212, 214, 216. In one non-limiting example, the sensor signal values may be clustered into two groups e.g., by using k-means clustering with k=2. In this example, the cluster with the higher mean value corresponds to sensors in an area of impact, and the cluster with the lower mean value corresponds to sensors in non-impact areas. The first estimated impact location 220 may then be estimated as the spatial center of the sensor cluster with the higher mean. This method avoids the problem of determining a threshold setting for distinguishing a signal indicating an impact from a signal indicating a non-impact area. However, in other examples, a pre-determined threshold may be used.

For example, sensor signal levels from non-impact areas may be learned from training data collected during typical vehicle operations. The learned signal levels corresponding to non-impact areas may be used as reference signals. For example, a measured sensor signal may be compared with the reference signal, and if the difference is higher than a threshold, the sensor may be identified as being in an area of impact. The estimated impact location may then be computed as the spatial center of the sensors identified as being in the area of impact. In another example, the estimated impact location could correspond to the location of the sensor with the highest signal level.

In another example, the impact location estimation component 124 may use an internal grid representation to represent the spatial distribution of the sensors. Though the electromechanical sensors 210, 212, 214 are illustrated as strips, they could also be represented as individual sensors associated with a discrete area or cell(s) on the grid. For example, a portion of a surface of the vehicle 200 e.g. the lateral side 206, can be represented as a two-dimensional grid. In examples, the unique identifiers of the sensors 210 may be associated with the location of the sensor on the grid. The identifier may encapsulate the location information, as a non-limiting example. In another example, a look-up table may be available to map the unique identifiers to locations on the grid representing the lateral side 206 of the vehicle 200 e.g., sensor 210a at row x and column y of the grid. The grid cells may represent individual sensors, or a single sensor may occupy multiple grid cells. The size of the grid cells may vary based on the granularity of impact localization of the low-energy impact collision detection system 118. All grid cells may not be of the same size e.g., the grid may be finer (with smaller cells) in areas with denser sensor coverage, or in areas where a finer localization of the impact is desirable.

The impact location estimation component 124 may also implement techniques to determine the second estimated impact location 222 from sensor data generated by the acoustic sensors 216. The acoustic portion of the sensor data 122 includes a signal level captured by each acoustic sensor 216, and a corresponding unique identification of the sensor. The unique identification is associated with a location of the sensor on the body 202 of the vehicle 200. The impact location estimation component 124 can use a number of techniques to localize the source of a sound or computing an estimate of source location, e.g., as the second estimated impact location 222, from acoustic waves measured at different points. The source of the sound, in this case, is at the location of impact 218, and localizing the source of the sound provides the second estimated impact location 222. Localization techniques include estimates of the source location based on energy levels or received signal strength (RSS), time-of-arrival (TOA) measurements, time-difference-of-arrival (TDOA) measurements, and direction-of-arrival measurements at multiple, spatially distributed acoustic sensors. Signal processing techniques such as a steered response power (SRP) function may also be used for source localization with inputs from spatially distributed acoustic sensors. In an example, using data from the acoustic sensors 216b and 216c, an estimate of the location of impact can be determined e.g., at the second estimated location 222 shown in FIG. 2. In examples, the impact location estimation component 124 may identify data associated with sounds above a threshold level, e.g., above a threshold decibel level, for impact location estimation. In other examples, the impact location estimation component 124 may identify data associated with sounds that vary by more than a threshold from an ambient or baseline level of sound, e.g., such that the actual decibel level varies based on ambient noise.

In the example of FIG. 2, the first estimated impact location 220 may be relatively closer to the actual impact location 218 and the second estimated impact location 222 may be relatively further from the actual impact location 218. For example, because there are more electromechanical sensors in a more elaborate array, the first estimated impact location 220 may have a higher fidelity. Alternatively, because the acoustic sensors are arranged in a straight line, the second estimated impact location may be generally along that line. Of course, different arrangements may provide different results. In addition to the arrangement and number of sensors, the accuracy of the first estimated impact location 220 and/or of the second estimated impact location 222 may vary based on the quality of the sensor data, the processing techniques used, and/or other factors. Moreover, although the example of FIG. 2 illustrates the first and second impact locations 220, 222 as being separately considered using different sensor data types, in other instances the impact location estimation component 214 may determine an estimated impact location, e.g., based on the sensor data from the electromechanical sensors 210, 212, 214 and from the acoustic sensors 216. Without limitation, a model may be trained on acoustic data and data from electromechanical sensors to determine a single estimated impact location. In still further examples, a single estimated impact location may be an average or other function of the first estimated impact location 220 and the second estimated impact location.

The impact location estimation component 124 may also generate a third estimated impact location 224 in some examples. Without limitation, the third estimated impact location 224 may be based on perception data, such as the perception data 134. As shown in FIG. 2, the third estimated location may be an area where there is a higher probability of impact based on object(s) and/or corresponding trajectories of objects indicated in the perception data 134. For example, the third estimated impact location 224 may correspond to an area in which an object proximate to the vehicle 200 and/or based on a trajectory of that object, may collide with the vehicle 200. In some examples, the perception data 134 may include an expected area of impact corresponding to the third estimated location 224.

The impact location estimation component 124 may also implement various Artificial Intelligence (AI) techniques for predicting the location and type of a collision from a set of sensor signals. The AI techniques may include machine learning (also referred to, generally, as machine learned models), such as one or more neural networks. For example, a neural network may be trained to classify an input vector comprising the sensor signal values for the sensors 110 into a type of impact (including a non-impact). A separate neural network that encodes the spatial distribution of the input signals e.g. a convolutional neural network, may be trained to estimate the location of impact from the sensor data 122. Training data sets corresponding to low-energy impact collisions may be gathered from operating data of vehicles equipped with the relevant sensors. The training data set may be labeled with the location and type of impact, and include data where there is no impact. When trained model (s) are deployed as an implementation of the impact location estimation component 124, sensor data 122 form the inputs to the trained model, and an estimate of the location of impact and the type of impact is obtained as outputs. In examples, separate neural networks each trained with a different type of sensor modality may be deployed e.g., one or more neural networks trained with acoustic sensor data, and a separate set of neural networks trained with electromechanical sensor data. A single neural network with different types of sensor signals agglomerated as inputs may also be used instead. Additional examples of architectures include neural networks such as ResNet50, ResNet101, VGG, DenseNet, PointNet, and the like. The techniques used for estimating impact location may be similar or different for each type of sensor.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

As discussed above, the location associated with each sensor may be expressed in various ways in two or three dimensions, such as three-dimensional coordinates of a center of the sensor with respect to an origin at the center of the vehicle 200, two-dimensional coordinates of the center of the sensor with respect to an origin on a plane representing a section of the vehicle 200 (e.g. lateral side 206), or as cell locations on a two- or three-dimensional grid. The estimated impact location(s) 220, 222, 224 may be expressed in the same coordinate system using the same or different granularity, or may be expressed using a different scheme. For example, the estimated impact location(s) 220, 222, 224 may be expressed in terms of areas on the body 202 of the vehicle 200 e.g. first lateral side, second lateral side, first end, second end, third wheel cover etc. In another example, the estimated impact locations 220, 222, 224 may be expressed at a lower granularity in the same two- or three-dimensional grid used to describe sensor locations. The estimated impact location(s) 220, 222, 224 may also be expressed using different schemes based on the certainty levels of the estimate. For example, the third estimated impact location 224 may be expressed in terms of areas on the body 202 of the vehicle 200 e.g. first lateral side; the second estimated location 222 may be expressed as a location on a two-dimensional grid, and the first estimated location 220 may be expressed as a location on a two-dimensional grid at a coarser granularity.

As described, the impact location estimation component 124 may determine the first estimated impact location 220 based on the electromechanical sensor data and the second estimated impact location 222 based on the acoustic data. In addition, the third estimated location 224 may be determined based on the perception data 134. Though a single estimate of location of impact is shown for each type of sensor modality/data source there may be zero, one or more estimates of location of impact from each sensor type.

The event detection component 126 may use some or all of the first, second, and third estimated locations 220, 222, 224 to determine if an impact event has occurred. In some examples, the event detection component 126 compares the first estimated impact location 220 and the second estimated impact location 222. The comparison may be in the form of a spatial distance between the two locations 220, 222. If the distance is below a threshold, the two locations are determined to correspond to each other. In the instance that the distance between the impact locations 220, 222 is equal or higher than the threshold, the locations 220, 222 are determined to not be corresponding to each other, and a no-impact event is determined by the event detection component 126. If a third estimated location 224 is available, e.g., based on perception data 134, then an impact event may be determined by the event detection component 126 when the first estimated impact location 220 and/or the second estimated impact location 222 overlap with the area covered by third estimated impact location 224. Otherwise, a no-impact event is determined by the event detection component 126. If perception data 134 is not available, the event detection component 126 determines an impact event 124 the two locations 220 and 222 are determined to correspond to each other. If either the electromechanical sensors or the acoustic sensors do not generate an estimate of location of impact e.g., no collision is detected by the sensor, then the event detection component 126 determines a no-impact event. In examples, there may not be a threshold used to determine correspondence, and instead, a correspondence between the two locations 220, 222 may be based on both locations being on the same surface of the body 202 of the vehicle 200 e.g., first lateral side, second lateral side, first end, second end, third wheel cover or the like.

In another embodiment of the event detection component 126, a third estimated location 224 of impact based on perception data 134 is received as input from the impact location estimation component 124. As described above, estimates of the location(s) of impact 220, 222 are also obtained for each type of sensor modality e.g., electromechanical, acoustic. The estimated location of impact 224 is compared with the estimates of location of impact 220, 222. The comparison may be in the form of determining an overlap between location 224 and the other location e.g., 220 or 222. If there is an overlap between location 224 and either one of the locations 220 or 222, the event detection component 126 determines an impact event. Otherwise, if there is no overlap e.g., both locations 220 and 222 fall outside the location indicated in 224, a no-impact event is determined by the event detection component 126. Using a combination of estimated locations from different sensor modalities and perception data, as described, allows an impact event to be confirmed with higher certainty.

Figure 3:
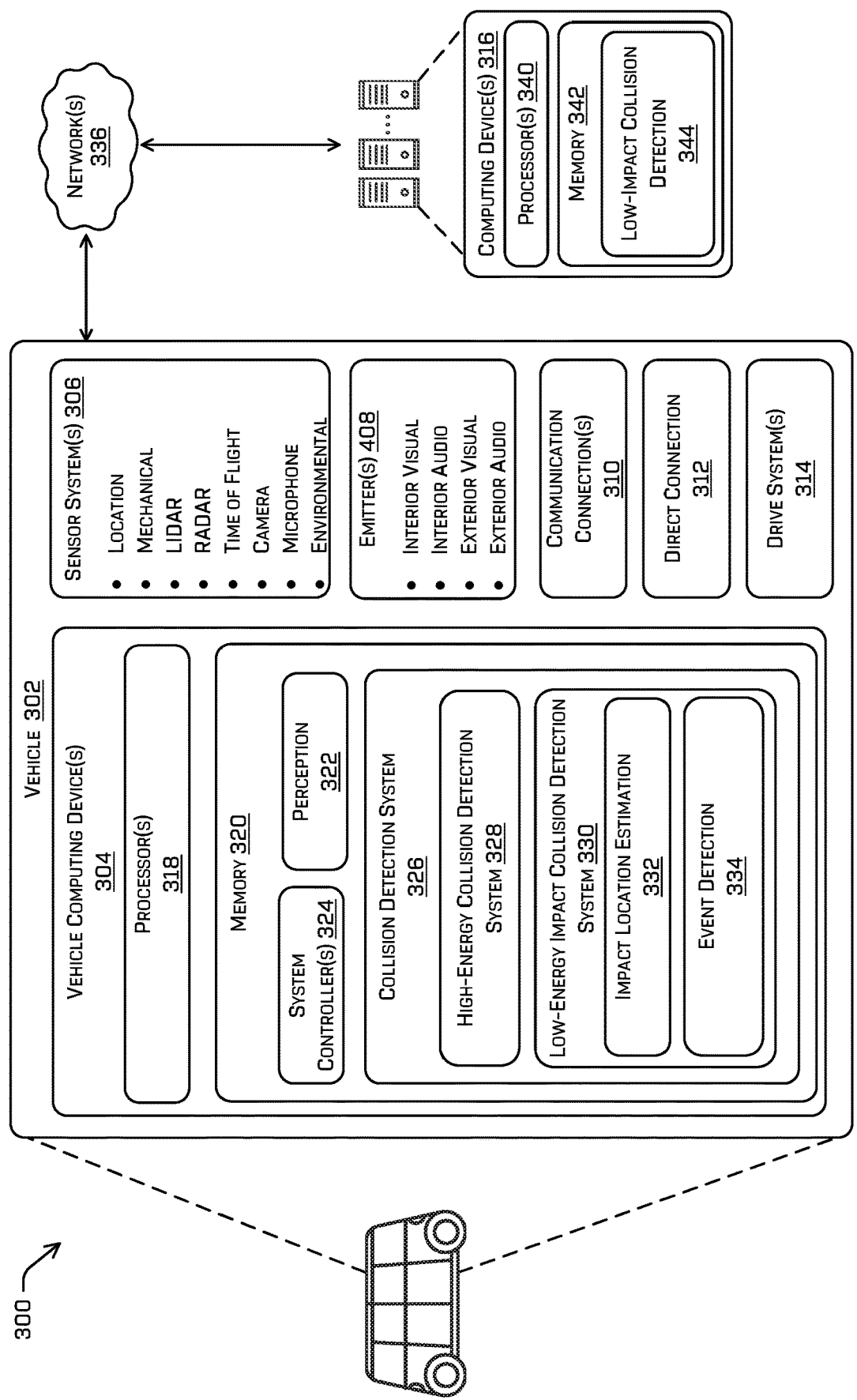
FIG. 3 depicts a block diagram of an example system for implementing the techniques described herein.

FIG. 3 depicts a block diagram of an example system 300 for implementing the techniques described herein. In some instances, the system 300 may include a vehicle 302, which may correspond to the vehicle 100 of FIG. 1, and/or the vehicle 200 of FIG. 2. In some instances, the vehicle 302 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 302 may be a fully or partially autonomous vehicle having any other level or classification. Moreover, in some instances, the techniques described herein may be usable by non-autonomous vehicles as well.

The vehicle 302 can include vehicle computing device(s) 304, one or more sensor systems 306, one or more emitters 308, one or more communication connections 310, at least one direct connection 312 (e.g., for physically coupling the vehicle 302 to exchange data and/or to provide power), and one or more drive systems 314.

In some instances, the sensor(s) 306 may include light detection and ranging (LIDAR) sensors, RADAR sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), cameras (e.g., red-green-blue (RGB), infrared (IR), intensity, depth, time of flight, etc.), microphones, wheel encoders, environment sensors (e.g., temperature sensors, humidity sensors, light sensors, pressure sensors, etc.), etc. The sensor(s) 808 may include multiple instances of each of these or other types of sensors. For instance, the LIDAR sensors may include individual LIDAR sensors located at the corners, front, back, sides, and/or top of the vehicle 302. As another example, the cameras may include multiple cameras disposed at various locations about the exterior and/or interior of the vehicle 302. The sensor(s) 306 may provide input to the vehicle computing device(s) 304.

The vehicle 302 may also include the emitter(s) 308 for emitting light and/or sound, as described above. The emitter(s) 308 in this example may include interior audio and visual emitter(s) to communicate with passengers of the vehicle 302. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 308 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 302 may also include the communication connection(s) 310 that enable communication between the vehicle 302 and one or more other local or remote computing device(s). For instance, the communication connection(s) 310 may facilitate communication with other local computing device(s) on the vehicle 302 and/or the drive system(s) 314. Also, the communication connection(s) 308 may additionally or alternatively allow the vehicle 302 to communicate with other nearby computing device(s) (e.g., other nearby vehicles, traffic signals, etc.). The communication connection(s) 310 may additionally or alternatively enable the vehicle 302 to communicate with a computing device 316.

The vehicle computing device(s) 304 can include one or more processors 318 and memory 320 communicatively coupled with the one or more processors 318. In the illustrated example, the memory 318 of the vehicle computing device(s) 304 stores a perception component 322, one or more system controllers 324, and a collision detection system 326 comprising a high-energy collision detection system 328 and a low-energy impact collision detection system 330. Though depicted in FIG. 3 as residing in memory 320 for illustrative purposes, it is contemplated that the perception component 322, the one or more system controllers 324, and the collision detection system 326 may additionally, or alternatively, be accessible to the vehicle 302 (e.g., stored remotely).

In some instances, the perception component 322 can include functionality to perform object detection, segmentation, and/or classification. In some examples, the perception component 322 can provide processed sensor data that indicates a presence of an entity that is proximate to the vehicle 302 and/or a classification of the entity as an entity type (e.g., car, pedestrian, cyclist, animal, building, tree, road surface, curb, sidewalk, unknown, etc.). In additional or alternative examples, the perception component 322 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc.

Characteristics associated with the environment can include, but are not limited to, a presence of another entity in the environment, a state of another entity in the environment, a time of day, a day of a week, a season, a weather condition, an indication of darkness/light, etc.

In at least one example, the vehicle computing device(s) 304 can include one or more system controllers 324, which can be configured to control steering, propulsion, braking, safety, emitters, communication, and other systems of the vehicle 302. The system controller(s) 324 can communicate with and/or control corresponding systems of the drive system(s) 314 and/or other components of the vehicle 302.

The system controller(s) 324 may be communicatively coupled to one or more sensors of the vehicle sensor system(s) 306. By way of non-limiting example, the sensors may detect the presence of objects in the environment of the vehicle and/or determine attributes of those objects. The system controller(s) 324 may also cause activation of a safety system of the vehicle 302 when it is determined that the safety system should be activated. For example, the system controller 324 may instruct an airbag control unit to deploy one or more airbags, or may send a signal to a tensioner arranged to adjust tensioning of one or more restraints. Other safety systems are known and may be activated. In other embodiments, the system controller 324 may instruct activation of multiple safety systems. In some embodiments, some or all functionality of the safety system controller 324 may be performed remote from the vehicle 302, e.g., at a remote server associated with a dispatch or headquarters for the vehicle 302 or in the cloud. In other implementations, some or all of the functionality of the system controller(s) 324 may be performed at the vehicle 302 to minimize any delay that could result from the transmission of data between locales.

The drive system(s) 314 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 314 may include a drive system controller which may receive and preprocess data from the sensor(s) and to control operation of the various vehicle systems. In some instances, the drive system controller may include one or more processors and memory communicatively coupled with the one or more processors. The memory may store one or more modules to perform various functionalities of the drive system(s) 314. Furthermore, the drive system(s) 314 may also include one or more communication connection(s) that enable communication by the respective drive system with one or more other local or remote computing device(s).

The collision detection system 326 comprises a high-energy collision detection system 328 configured to detect relatively higher impact collisions using inputs from one or more sensors of the sensor system(s) 306. For example, inputs from accelerometers placed proximate the front of the vehicle may indicate a head-on collision with an object. A collision indication from the high-energy collision detection system 328 causes the system controller(s) 324 to deploy vehicle safety systems, for example, one or more airbags, air curtains, restraint systems, or the like.

The low-energy impact collision detection system 330 may correspond to the low-energy impact collision detection system 118 of FIG. 1, and its components 332 and 334 may correspond to the impact location estimation component 124 and the event detection component 126 respectively. The low-energy impact collision detection system 330 is configured to detect low-energy impact collisions, and is operatively coupled with the system controller(s) 324.

In response to a collision event indication from the low-energy impact collision detection system 330, the system controller(s) 324 may take one or more of the following actions, as non-limiting examples. The system controller(s) 324 may engage the drive system(s) 314 to bring the vehicle 302 to a stop. The system controller(s) 324 may open a communication connection(s) 310 between a communication unit of the vehicle 302 and a tele-operator over a network 336. This connection may enable a two-way communication between the tele-operator and person(s) located in and around the vehicle 302. The system controller(s) 324 may also store vehicle operational data such as vehicle speed, heading, steering angle, as well as data from sensor system(s) 306 for an interval of time preceding and subsequent to the low-energy impact collision event. The operational data may be stored locally in the on-board memory 320 of the vehicle 302, or be transmitted via network(s) 336 to an external computing device(s) 316 to be stored in external memory 342. The system controller(s) 324 may also engage the emitter(s) 308 on vehicle 302 to indicate a hazard condition when a low-energy impact collision indication is received. For example, an audio emitter may sound the horn, or make an announcement in the interior of the vehicle 302. A visual emitter such as hazard lights on the exterior of the vehicle 302 may also be activated. The lighting in the interior of the vehicle 302 may also indicate an impact event.

In some examples, the vehicle 302 can send operational data, including raw or processed sensor data from the sensor system(s) 306, to one or more computing device(s) 316 via the network(s) 336. The operational data can be sent in response to a collision event detected by the collision detection system 328. In other examples, the vehicle 302 can send processed operational data and/or representations of operational data to the computing device(s) 316 at a particular frequency, after a lapse of a predetermined period of time, in near real-time, etc. In some cases, the vehicle 302 can send raw or processed operational data to the computing device(s) 316 as one or more log files.

In some instances, aspects of some or all of the components discussed herein may include any models, algorithms, and/or machine learning algorithms. For example, the component(s) in the memory 320, 342 may be implemented as a neural network. As can be understood in the context of this disclosure, a neural network can utilize machine learning, which can refer to a broad class of such algorithms in which an output is generated based on learned parameters.

Figure 4:
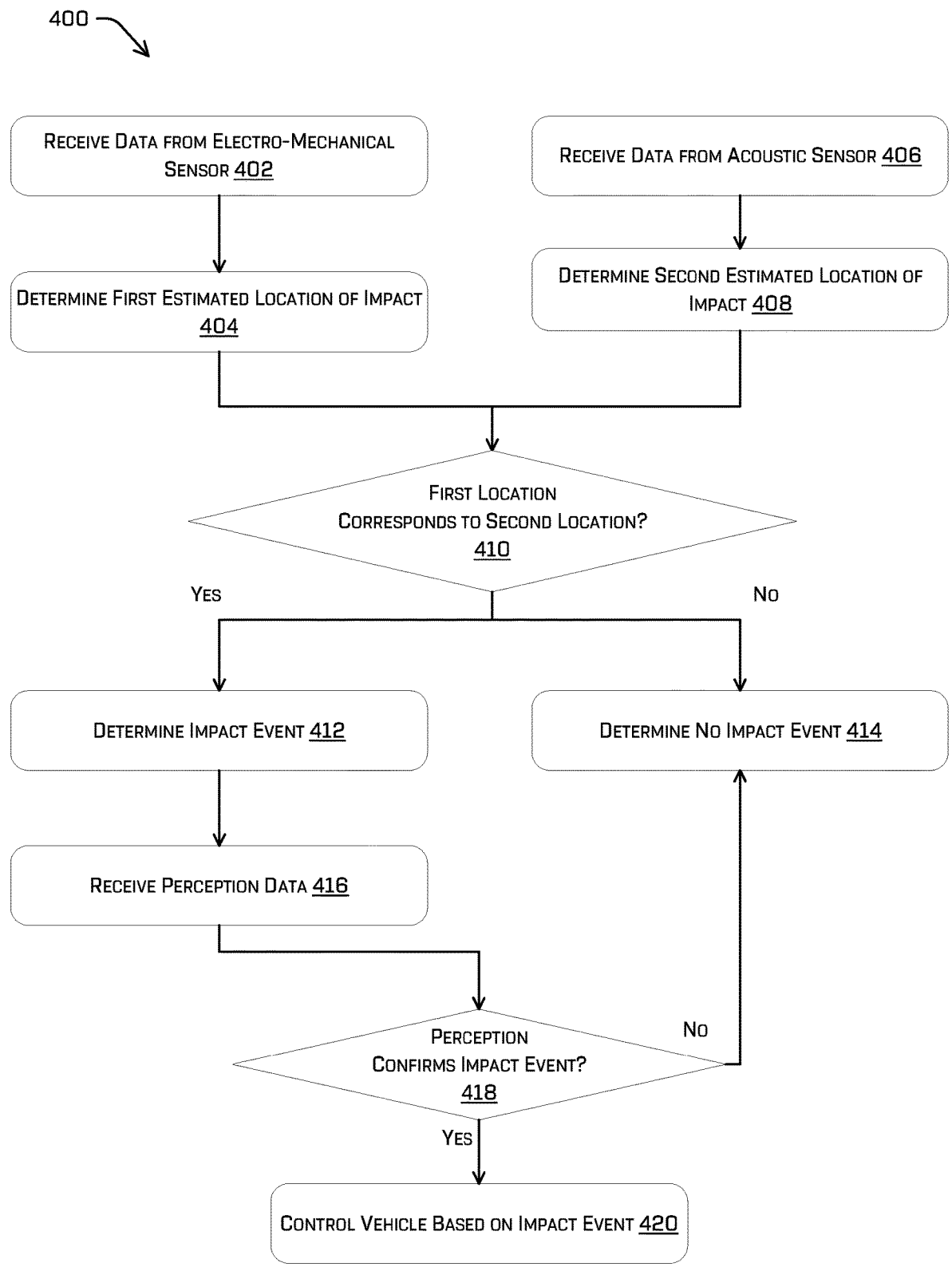
FIG. 4 illustrates an example process to determine an impact event and control a vehicle based on the event.
Figure 5:
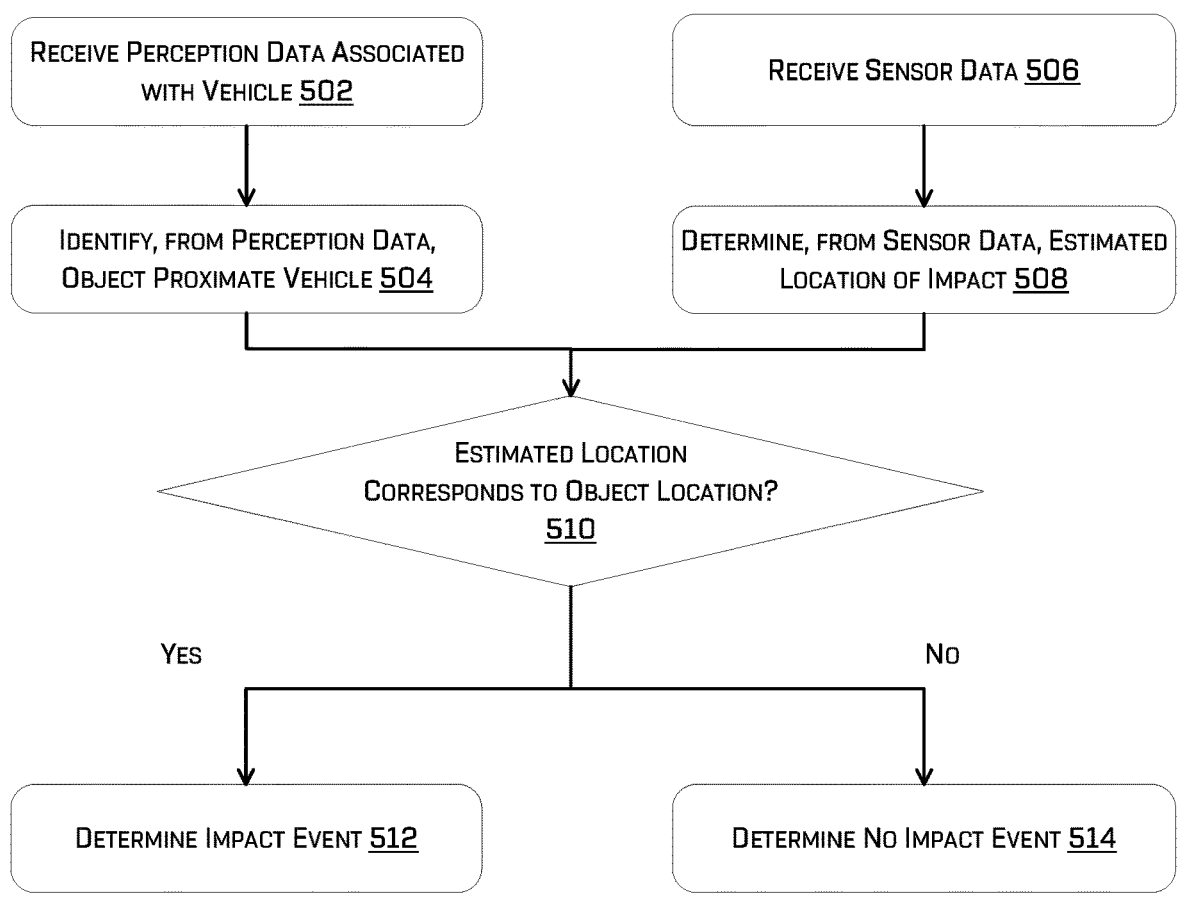
FIG. 5 illustrates an example process to determine an impact event.

FIG. 4 and FIG. 5 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

It should be appreciated that the subject matter presented herein may be implemented as a computer process, a computer-controlled apparatus, a computing system, or an article of manufacture, such as a computer-readable storage medium. While the subject matter described with respect to the process 400 and the process 500 are presented in the general context of operations that may be executed on and/or with one or more computing devices, those skilled in the art will recognize that other implementations may be performed in combination with various program/controller modules. Generally, such modules include routines, programs, components, data structures, and other types of structures that perform particular tasks or implement particular abstract data types.

Those skilled in the art will also appreciate that aspects of the subject matter described with respect to the process 400 and process 500 may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

FIG. 4 is a flow diagram illustrating an example process 400 for controlling a vehicle, such as one of the vehicles 100, 200, 302 based on confirming an event. In some examples, the process 400 may be performed by the low-energy impact collision detection system 118, 330 of the present disclosure and the vehicle controlled by system controller(s) 120, 324.

More specifically, the example process 400 includes, at an operation 402, receiving sensor data from electromechanical sensor(s) disposed on a body of a vehicle. For example, the sensor data may be received from one or more of the electromechanical sensors 110, 210, 212, 214, 406 described herein. The electromechanical sensors may be associated with exterior surface of the vehicle, e.g., body panels of the vehicle. The electromechanical sensors generate a signal in response to an impact with the vehicle. In some implementations, the sensor data may be signal values detected by an impact sensor.

At an operation 404, the process 400 also includes determining a first estimated location of impact. In examples, the operation 404 can include comparing signals corresponding to sensed impacts from a plurality of the electromechanical sensors and estimating the location based on those signals. The operation 404 may be implemented by the impact location estimation components 124, 332, according to the functionality described above. In some examples, the first estimated location may be the second estimated location 222 of FIG. 2.

The process 400 may also include, at an operation 406, receiving sensor data from one or more acoustic sensors. For example, the sensor data may be received from the acoustic sensors 216 disposed on the vehicle 200. In examples, the acoustic sensor(s) can include a plurality of sensors disposed about the periphery of the vehicle. The acoustic sensors are configured to generate an audio signal in response to detecting sound, e.g., sound associated with an impact of the vehicle. For instance, a strength or value of the audio signal may correspond to the severity of impact on the vehicle.

At an operation 408, the process 400 includes determining a second estimated location of impact. In examples, the operation 408 can include comparing audio signals received at the operation 406 a plurality of the acoustic sensors and estimating a second location based on those signals. The operation 408 may be implemented by the impact location estimation components 124, 332, according to the functionality described above. In some examples, the second estimated location may be the first estimated location 220 of FIG. 2.

The process also includes, at an operation 410, determining whether the first estimated location of impact corresponds to the second estimated location of impact. For example, the operation 410 may compare the first estimated location and the second estimated and determine whether the locations are within a threshold distance of each other. The operation 410 may be implemented by the event detection component 126, 334 of the low-energy impact collision detection system 118, 330 of the present disclosure.

If at the operation 410 it is determined that the first estimated location of impact corresponds to the second estimated location of impact, at an operation 412 the process 400 determines an impact event. For example, the process 400 determines an impact when both the first sensor data and the second sensor data confirm proximate impacts. In at least some examples, some controls may be applied based at least in part on the determination of an impact such as, but not limited to, storing sensor data associated with a set amount of time prior to and/or following the detection, decreasing a speed, transmitting one or more of information or a request for confirmation to a tele-operator system, or the like.

Alternatively, if at the operation 410 it is determined that the first estimated location of impact does not correspond to the second estimated location of impact, then a no-impact event is determined at an operation 414 of the process 400. Specifically, if the sensors have determined impacts of location that are not associated with each other, or only one of the sensor modalities has generated data associated with an impact, then the process 400 determines that no impact with the vehicle has occurred. For example, no action associated with impacts may be taken when no event is determined.

At an optional operation 416, the process 400 may optionally receive perception data. For example, the perception data may be the perception data 134 from the perception system 132. As described herein, a perception system of the vehicle may generate data about objects in an environment of the vehicle, e.g., using sensor data from one or more sensors disposed on the vehicle. In examples, the perception data may be determined from data other than the sensor data received at the operations 402, 406 discussed above.

At an operation 418, in instances in which the process 400 includes receiving the perception data, the process 400 includes determining whether the perception data confirms the impact event. For example, the operation 418 can include determining whether the perception data indicates an object proximate the vehicle in the vicinity of the first and second estimated locations. For example, if an object in the perception data is within a threshold distance of the vehicle, e.g., 1 meter, and/or within a threshold distance of an estimated location on the vehicle of the impact event determined at the operation 412, e.g., based on the first estimated location of impact and/or the second estimated location of impact, the operation 418 may determine that the perception data confirms the impact event. The operation 418 may also be implemented by the event detection component 126, 334 of the low-energy impact collision detection system 118, 330 of the present disclosure.

If, at the operation 418, it is determined that the perception data confirms the impact event, the process 400 includes controlling the vehicle based on the impact event. As detailed further herein, the operation 420 can include controlling the vehicle to come to a stop, controlling the vehicle to request assistance from a passenger, an authority, and/or a nearby person, controlling the vehicle to generate an incident report, controlling the vehicle to request assistance from a teleoperator, controlling the vehicle with reduced functionality, e.g., a lower maximum speed, by travelling forward in only a second direction, based on data from fewer sensors, or the like, or otherwise controlling the vehicle. As noted above, the operations 416, 418 may be optional, and when the process does not include those operations, the process 400 may proceed directly from the operation 412 to the operation 420, e.g., to control the vehicle based on the determined impact event.

In some examples, the operations 416, 418 may act as a further check or confirmation of the impact detected at the first estimated location and/or the impact detected at the second estimated location. Data other than the perception data may also or alternatively be received and/or considered in conjunction with the process 400. For instance, the process can also or alternatively include receiving an input from a primary collision detection system indicating whether a relatively higher impact collision has occurred. For instance, when the vehicle has been involved in a more severe accident, the vehicle may be controlled in accordance with protocols for the higher impact collision. Aspects of this disclosure may relate to controlling the vehicle, e.g., at the operation 420, in response to low impact collisions, whereas the functionality may be superseded by another processing system in the event of a higher impact crash. Thus, in some examples, if there is no indication of a relatively higher impact collision, the impact event corresponding to a low-energy impact collision event may be determined at the operation 412.

As also illustrated in FIG. 4, if at the operation 418 it is determined that the perception data does not confirm the impact event, the process 400 may proceed to the operation 414, at which no impact is determined, as discussed above. That is, even if the first location is determined to correspond to the second location at the operation 410, the optional perception data may overrule the impact event. In other examples, other actions may be taken in response to a disagreement of the perception data with the first and second locations. For example, the area of the impact location may be flagged and more closely monitored, e.g., using sensors other than the electromechanical sensor(s) and/or the acoustic sensor(s). Moreover, additional data about the impact location may be requested from sensors other than the electromechanical sensor(s) and/or the acoustic sensor(s).

FIG. 5 is a flow diagram illustrating an example process 500 for controlling a vehicle 100, 200, 302 based on confirming an event. In some examples, the process 500 may be performed by the low-energy impact collision detection system(s) 118, 330 of the present disclosure, and the vehicle may be controlled by the system controller(s) 120, 324 as discussed above.

More specifically, at an operation 502, the process 500 includes receiving perception data. For example, the perception data may be the perception data 134 from the perception system 132 of the vehicle 100. As described herein, a perception system of the vehicle may generate data about objects in an environment of the vehicle, e.g., using sensor data from one or more sensors disposed on the vehicle. In examples, the perception data may be determined from data other than the sensor data received at the operations 402, 406 discussed above.

At an operation 504, the process 500 includes identifying, from the perception data, an object proximate a vehicle. For example, the perception data may include representations of objects at sensed locations in the environment of the vehicle. In at least some examples, the operation 504 can include identifying objects within a threshold distance of the vehicle, e.g., 10 centimeters, 0.5-meter, one meter, or the like.

At an operation 506, the process 500 includes receiving sensor data. For example, the sensor data may be the sensor data 122 generated by the first sensor(s) 110 and, as discussed above in connection with FIG. 1, used to determine low-energy impact collisions with the vehicle. Also in examples, the sensor data may correspond to the sensor data received at the operation 404 and/or the sensor data received at the operation 408, discussed above. Without limitation, the sensor data may be from a single modality, e.g., electromechanical sensor(s), acoustic sensor(s), or the like, or from multiple modalities.

At an operation 508, the process 500 includes determining, from the sensor data, an estimated location of impact. For example, the operation 508 may correspond to the operation 404 and/or the operation 408 of the process 400 discussed above. For instance, the operation 508 can include determining a first estimated location based on data generated by a first sensor modality and/or a second estimated location based on data generated by a second sensor modality. In other instances, the estimated location may be based on sensor data from one or more sensor modalities.

At an operation 510, the process 500 includes determining whether the estimated location corresponds to an object location. For example, the operation 510 can include determining whether the object location is within a threshold distance of the estimated location(s). In other examples, the operation 510 can include determining whether the estimated location is on a body panel or in a region to which the object is proximate.

If, at the operation 510, it is determined that the estimated location corresponds to the object location, at an operation 512 the process determines an impact event. For instance, the operation 512 may correspond to the operation 412 discussed above. Although not illustrated in FIG. 5, the process 500 can also include controlling the vehicle based on the impact event, e.g., as in the operation 420 discussed above.

Alternatively, if at the operation 510 it is determined that the estimated location does not correspond to the object location, at an operation 514 the process 500 includes determining no impact event. For example, the operation 514 may correspond to the operation 414, discussed above.

Based on the foregoing, it should be appreciated that although the subject matter presented herein has been described in language specific to structural components of example vehicle systems 100, 200, 402, methodological acts, computer readable media, and/or other structural components operably connected to system controllers 120, 424, it is to be understood that the invention defined in the appended claims is not necessarily limited to the specific features, acts, or media described herein. Rather, the specific features, acts, and media are disclosed as example forms of implementing the subject matter recited in the claims.

EXAMPLE CLAUSES

A: An example autonomous vehicle includes: electromechanical sensors; acoustic sensors; one or more processors; and one or more computer-readable media storing instructions that, when executed, cause the one or more processors to perform operations comprising: receiving, from the electromechanical sensors, electromechanical sensor data indicative of a first impact associated with the autonomous vehicle; determining, based at least in part on the electromechanical sensor data, a first location of the first impact; receiving, from the acoustic sensors, acoustic sensor data indicative of a second impact associated with the autonomous vehicle; determining, based at least in part on the acoustic sensor data, a second location of second impact; determining, based at least in part on the first location corresponding to the second location, an impact event associated with the autonomous vehicle; and controlling the autonomous vehicle based at least in part on the impact event.

B: The autonomous vehicle of example A, wherein: the electromechanical sensors comprise an impact sensor coupled to a body panel of the autonomous vehicle, the impact sensor configured to generate a signal corresponding to a magnitude of an impact; and determining the first location is based at least in part on the signal having a magnitude greater than or equal to a threshold.

C: The autonomous vehicle of example A or example B, wherein: the acoustic sensors comprise a first microphone coupled to the autonomous vehicle and a second microphone coupled to the autonomous vehicle and spaced from the first microphone; and determining the second location is based at least in part on analyzing a first audio signal corresponding to sound received at the first microphone and a second audio signal corresponding to sound received at the second microphone.

D: The autonomous vehicle of any one of example A through example C, further comprising: a perception system configured to generate perception data associated with objects in an environment of the autonomous vehicle, the operations further comprising: detecting, based at least in part on the perception data, an object proximate to at least one of the first location or the second location, wherein determining the event is based at least in part on detecting the object.

E: The autonomous vehicle of any one of example A through example D, the operation further comprising: controlling the autonomous vehicle based at least in part on the impact event, the controlling the autonomous vehicle comprising at least one of: controlling the autonomous vehicle to come to a stop; communicating with a computing device associated with at least one of a passenger or a remote operator associated with the autonomous vehicle; retrieving additional sensor data associated with at least one of the first estimated location or the second estimated location; or generating impact event data.

F: An example method includes: receiving, from a first system associated with a vehicle, first data; receiving, from a second system associated with the vehicle, second data; determining, based at least in part on the first data, a first estimated location of impact; determining, based at least in part on the second data, a second estimated location of impact; and determining, based at least in part on the first estimated location corresponding to the second estimated location, an impact event associated with the vehicle.

G: The method of example F, wherein at least one of: the receiving the first data comprises receiving first sensor data from a plurality of electromechanical sensors; or the receiving the second data comprises receiving second sensor data from a plurality of acoustic sensors.

H: The method of example F or example G, wherein the plurality of electromechanical sensors comprise one or more of: an impact sensor coupled to a body panel of the vehicle; a thin-film sensor embedded in the vehicle; or a conductive element associated with a fascia of the vehicle.

I: The method of any one of example F through example H, wherein the plurality of mechanical sensors are disposed about the vehicle determining the first estimated location comprises: receiving first impact sensor data generated by a first impact sensor of the plurality of impact sensors; receiving second impact sensor data generated by a second impact sensor of the plurality of impact sensors; and determining the first estimated location based on the first impact sensor data, the second impact sensor data, a first position of the first impact sensor in the array, and a second position of the second impact sensor in the array.

J: The method of any one of example F through example I, wherein the receiving the second sensor data comprises receiving the second sensor data from a plurality of acoustic sensors coupled to the vehicle.

K: The method of any one of example F through example J, wherein the determining the second estimated location comprises: receiving first acoustic data generated by a first acoustic sensor of the plurality of acoustic sensors; receiving second acoustic data generated by a second acoustic sensor of the plurality of acoustic sensors; and determining the first estimated location based on the first acoustic data and the second acoustic data.

L: The method of any one of example F through example K, wherein the receiving the first data comprises: receiving perception data from a perception system associated with the vehicle, the perception data including information about an object proximate the vehicle.

M: The method of any one of example F through example L, wherein determining that the first estimated location of impact is less than or equal to a threshold distance from the second estimated location.

N: The method of any one of example F through example M, wherein the first data comprises a plurality of signal values and the determining the first estimated location comprises: using k-means clustering to determine a cluster of sensors associated with the first system having a higher mean value; and determining the first estimated location as a spatial center of the cluster of sensors.

O: An example vehicle includes: a first system associated with the vehicle and configured to generate first data associated with the vehicle; a second system associated with the vehicle and configured to generate sensor data associated with the vehicle; one or more processors; and one or more computer-readable media storing instructions that, when executed, cause the one or more processors to perform operations comprising: receiving the first data; determining, based at least in part on the first data, a first estimated location of impact; receiving the second data; determining, based at least in part on the second sensor data, a second estimated location of impact; determining, based at least in part on the first estimated location corresponding to the second estimated location, an impact event associated with the vehicle; and controlling the vehicle based at least in part on the impact event.

P: The vehicle of example O, wherein at least one of: the receiving the first data comprises receiving sensor data from a sensor; or the receiving the first data comprises receiving perception data from a perception system.

Q: The vehicle of example O or example P, wherein: determining the first estimated location comprises: receiving, as the first data, first impact sensor data generated by a first impact sensor of the plurality of impact sensors; receiving second impact sensor data generated by a second impact sensor of the plurality of impact sensors; and determining the first estimated location based on the first impact sensor data, the second impact sensor data, a first position of the first impact sensor in the array, and a second position of the second impact sensor in the array.

R: The vehicle of any one of example O through example Q, wherein: the one or more sensors comprise a plurality of acoustic sensors arranged in an array proximate a surface of the vehicle; and the determining the estimated location comprises: receiving first acoustic data generated by a first acoustic sensor of the plurality of acoustic sensors; receiving second acoustic data generated by a second acoustic sensor of the plurality of acoustic sensors; and determining the first estimated location based on the first acoustic data, the second acoustic data, a first position of the first acoustic sensor in the array, and a second position of the second acoustic sensor in the array.

S: The vehicle of any one of example O through example R, wherein: the one or more sensors comprise a plurality of electromechanical sensors and a plurality of acoustic sensors, and the estimated location is based at least in part on positions of the plurality of electromechanical sensors and the plurality of acoustic sensors on the vehicle.

T: The vehicle of any one of example O through example S, wherein the controlling the vehicle comprises at least one of stopping the vehicle, transmitting operational data, or enabling two-way communication between a tele-operator and a communication unit associated with the vehicle.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

What is claimed is:

1. An autonomous vehicle comprising:
   electromechanical sensors;
   audio sensors;
   one or more processors; and
   one or more computer-readable media storing instructions that, when executed, cause the one or more processors to perform operations comprising:
      receiving, from the electromechanical sensors, electromechanical sensor data indicative of a first impact associated with the autonomous vehicle;
      determining, based at least in part on the electromechanical sensor data, a first location of the first impact expressed at a first spatial granularity;
      receiving, from the audio sensors, audio sensor data indicative of a second impact associated with the autonomous vehicle;
      determining, based at least in part on the audio sensor data, a second location of the second impact expressed at a second spatial granularity coarser than the first spatial granularity;
      determining, based at least in part on the first location corresponding to the second location, an impact event associated with the autonomous vehicle; and
      controlling the autonomous vehicle based at least in part on the impact event.

2. The autonomous vehicle of claim 1, wherein:
   the electromechanical sensors comprise an impact sensor coupled to a body panel of the autonomous vehicle, the impact sensor configured to generate a signal corresponding to a magnitude of an impact; and
   determining the first location is based at least in part on the signal having a magnitude greater than or equal to a threshold.

3. The autonomous vehicle of claim 1, wherein:
   the audio sensors comprise a first microphone coupled to the autonomous vehicle and a second microphone coupled to the autonomous vehicle and spaced from the first microphone; and
   determining the second location is based at least in part on analyzing a first audio signal corresponding to sound received at the first microphone and a second audio signal corresponding to sound received at the second microphone.

4. The autonomous vehicle of claim 1, further comprising:
   a perception system configured to generate perception data associated with objects in an environment of the autonomous vehicle, the operations further comprising:
   detecting, based at least in part on the perception data, an object proximate to at least one of the first location or the second location,
   wherein determining the event is based at least in part on detecting the object.

5. The autonomous vehicle of claim 1, the operations further comprising:
   controlling the autonomous vehicle based at least in part on the impact event, the controlling the autonomous vehicle comprising at least one of:
      controlling the autonomous vehicle to come to a stop;
      communicating with a computing device associated with at least one of a passenger or a remote operator associated with the autonomous vehicle;
      retrieving additional sensor data associated with at least one of the first location or the second location; or
      generating impact event data.

6. A method comprising:
   receiving, from a first system comprising a plurality of impact sensors, first data associated with a vehicle;
   receiving, from a second system comprising a plurality of audio sensors, second data associated with the vehicle;
   determining, based at least in part on the first data, a first estimated location of impact, the first estimated location being bounded by a region of a first size;
   determining, based at least in part on the second data, a second estimated location of impact, the second estimated location being bounded by a region of a second size larger than the first size;
   determining, based at least in part on an overlap between the first estimated location and the second estimated location, an impact event associated with the vehicle; and
   controlling the vehicle based at least in part on the impact event.

7. The method of claim 6, wherein the plurality of impact sensors comprise one or more of:
an electromechanical sensor coupled to a body panel of the vehicle,
a thin-film sensor embedded in the vehicle, or
a conductive element associated with a fascia of the vehicle.

8. The method of claim 6, wherein the plurality of impact sensors are disposed in an array about the vehicle, and determining the first estimated location comprises:
receiving first impact sensor data generated by a first impact sensor of the plurality of impact sensors;
receiving second impact sensor data generated by a second impact sensor of the plurality of impact sensors; and
determining the first estimated location based on the first impact sensor data, the second impact sensor data, a first position of the first impact sensor in the array, and a second position of the second impact sensor in the array.

9. The method of claim 6, wherein the determining the second estimated location comprises:
receiving first audio data generated by a first audio sensor of the plurality of audio sensors, the first audio sensor being located at a first position;
receiving second audio data generated by a second audio sensor of the plurality of audio sensors, the second audio sensor being located at a second position; and
determining the second estimated location based on the first position and the second position.

10. The method of claim 6, further comprising:
receiving perception data from a perception system associated with the vehicle, the perception data including information about an object proximate the vehicle,
wherein determining the impact event is further based on the perception data.

11. The method of claim 6, wherein determining the impact event is further based on determining that the first estimated location of impact is less than or equal to a threshold distance from the second estimated location.

12. The method of claim 6, wherein the first data comprises a plurality of signal values and the determining the first estimated location comprises:
using k-means clustering to determine a cluster of sensors of the plurality of impact sensors having a highest mean signal value; and
determining the first estimated location as a spatial center of the cluster of sensors.

13. The method of claim 6, further comprising: determining a certainty level associated with the impact event based at least in part on a first certainty level associated with the first system and a second certainty level, different from the first certainty level, associated with the second system,
wherein controlling the vehicle is further based on the certainty level.

14. A vehicle comprising:
a first system of a first sensor modality comprising impact sensors configured to generate first data associated with the vehicle;
a second system of a second sensor modality comprising audio sensors configured to generate second data associated with the vehicle;
one or more processors; and
one or more computer-readable media storing instructions that, when executed, cause the one or more processors to perform operations comprising:
receiving the first data;
determining, based at least in part on the first data, a first estimated location of impact, the first estimated location of impact being expressed in a first spatial grid characterized by a first cell size;
receiving the second data;
determining, based at least in part on the second data, a second estimated location of impact, the second estimated location of impact being expressed in a second spatial grid characterized by a second cell size larger than the first cell size;
determining, based at least in part on the first estimated location corresponding to the second estimated location, an impact event associated with the vehicle; and
controlling the vehicle based at least in part on the impact event.

15. The vehicle of claim 14, the operations further comprising:
receiving perception data from a perception system of the vehicle, the perception data including information about an object proximate the vehicle, wherein determining the impact event is further based on the perception data.

16. The vehicle of claim 14, wherein the determining the first estimated location comprises:
receiving, as the first data, first impact sensor data generated by a first impact sensor of a plurality of impact sensors;
receiving second impact sensor data generated by a second impact sensor of a plurality of impact sensors; and
determining the first estimated location based on the first impact sensor data, the second impact sensor data, a first position of the first impact sensor in an array, and a second position of the second impact sensor in the array.

17. The vehicle of claim 14, wherein:
the second system comprises a plurality of audio sensors are arranged in an array proximate a surface of the vehicle; and
the determining the second estimated location comprises:
receiving first audio data generated by a first audio sensor of the plurality of audio sensors;
receiving second audio data generated by a second audio sensor of the plurality of audio sensors; and
determining the second estimated location is based on the first audio data, the second audio data, a first position of the first audio sensor in the array, and a second position of the second audio sensor in the array.

18. The vehicle of claim 14, wherein:
the first system comprises a plurality of electromechanical sensors, and
determining the first estimated location is based at least in part on positions of the plurality of electromechanical sensors on the vehicle.

19. The vehicle of claim 14, wherein the controlling the vehicle comprises at least one of stopping the vehicle, transmitting operational data, or enabling two-way communication between a tele-operator and a communication unit associated with the vehicle.

20. The vehicle of claim 14, wherein the first sensor modality is associated with a first certainty level and the second sensor modality is associated with a second certainty level, different from the first certainty level, the operations further comprising:

determining, based at least in part on the first certainty level and the second certainty level, a certainty level associated with the impact event,
wherein controlling the vehicle is further based on the certainty level.

* * * * *